United States Patent [19]

Gould

[11] 4,028,450

[45] June 7, 1977

[54] METHOD OF MOLDING A COMPOSITE SYNTHETIC ROOFING STRUCTURE

[76] Inventor: Walter M. Gould, 1731 Harriman Lane, Redondo Beach, Calif. 90278

[22] Filed: Apr. 19, 1974

[21] Appl. No.: 462,256

Related U.S. Application Data

[63] Continuation-in-part of Ser. No. 318,288, Dec. 26, 1972, abandoned, which is a continuation-in-part of Ser. No. 45,373, June 11, 1970, abandoned.

[52] U.S. Cl. .............................. 264/45.5; 52/309.1; 52/540; 52/560; 249/96; 264/46.4; 264/46.7; 264/259; 264/278; 264/338; 264/DIG. 14; 425/812; 425/817 R; 428/160; 428/310
[51] Int. Cl.² .................... B29D 27/04; E04D 1/20
[58] Field of Search .................. 264/46.4, 46.6, 48, 264/DIG. 14, 45.5, 338, 46.7; 52/309, 560, 540; 425/812, 817 R; 428/160, 310; 249/96

[56] References Cited

UNITED STATES PATENTS

| 1,805,689 | 5/1931 | Dietz | 52/560 |
|---|---|---|---|
| 2,394,327 | 2/1946 | Niessen et al. | 264/46.6 |
| 2,590,803 | 3/1952 | Unger | 425/812 |
| 3,099,516 | 7/1963 | Henrickson | 264/48 |
| 3,137,744 | 6/1964 | Burrus | 264/54 X |
| 3,163,687 | 12/1964 | Einhorn | 264/54 |
| 3,175,863 | 3/1965 | Hood | 264/DIG. 14 |
| 3,243,491 | 3/1966 | Bethe | 264/48 X |
| 3,246,059 | 4/1966 | Moroni et al. | 264/54 X |
| 3,576,930 | 4/1971 | Watters et al. | 264/46.4 X |
| 3,641,228 | 2/1972 | Fleck | 264/53 |
| 3,643,394 | 2/1972 | Johnson | 52/309 |
| 3,704,081 | 11/1972 | Immel | 425/812 X |
| 3,712,780 | 1/1973 | Jope et al. | 425/812 X |
| 3,759,479 | 9/1973 | Howell et al. | 425/817 R X |
| 3,760,546 | 9/1973 | Martin et al. | 52/309 |
| 3,773,875 | 11/1973 | Lammers | 264/46.6 X |
| 3,803,277 | 4/1974 | Bassett | 264/48 |
| 3,852,934 | 12/1974 | Kirkhuff | 52/560 X |

*Primary Examiner*—Philip Anderson
*Attorney, Agent, or Firm*—Jessup & Beecher

[57] ABSTRACT

A form molded synthetic foam roofing section having a relatively broad undersurface and an exposed surface configured to resemble interlocked and overlapping roofing shingles which is united to a support surface such as wood, metal, etc. during molding process. This section may be affixed by any conventional means such as nails and adhesives to roof boards, rafters or over old existing roofing structure.

13 Claims, 17 Drawing Figures

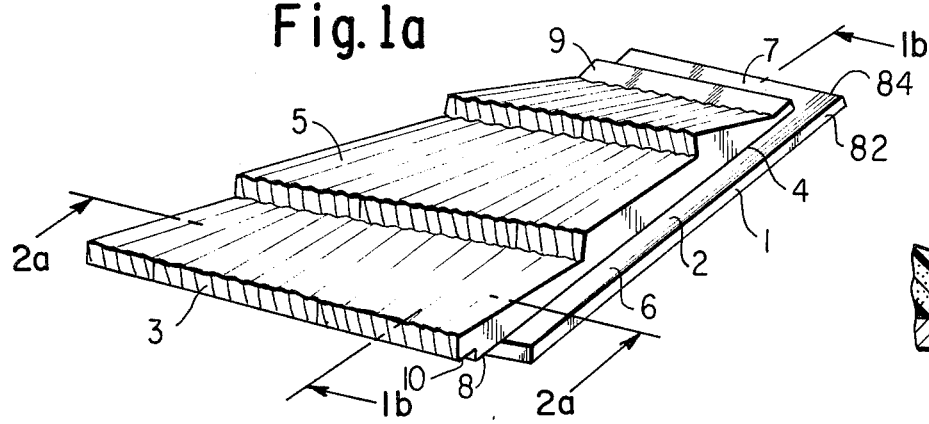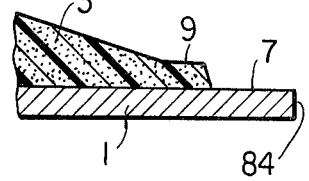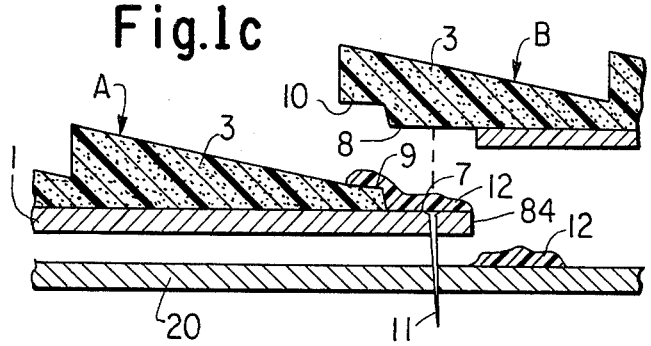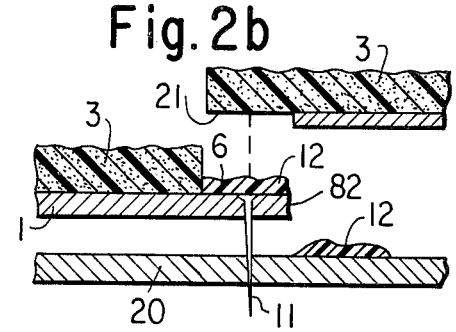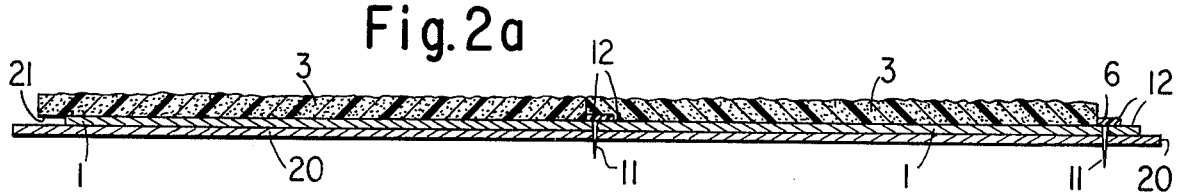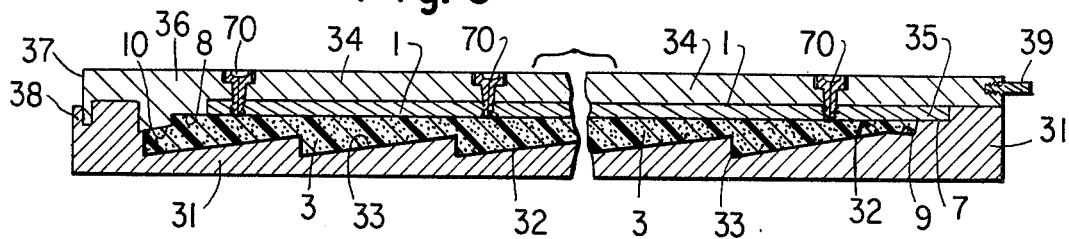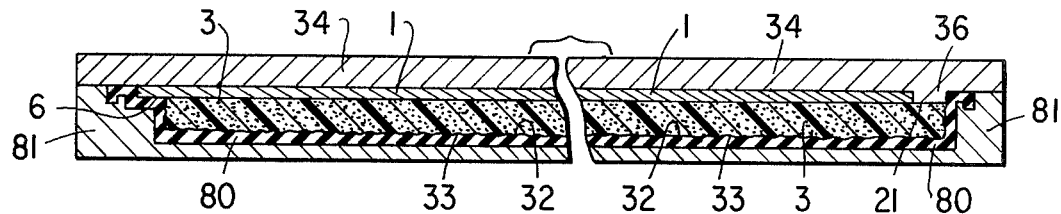

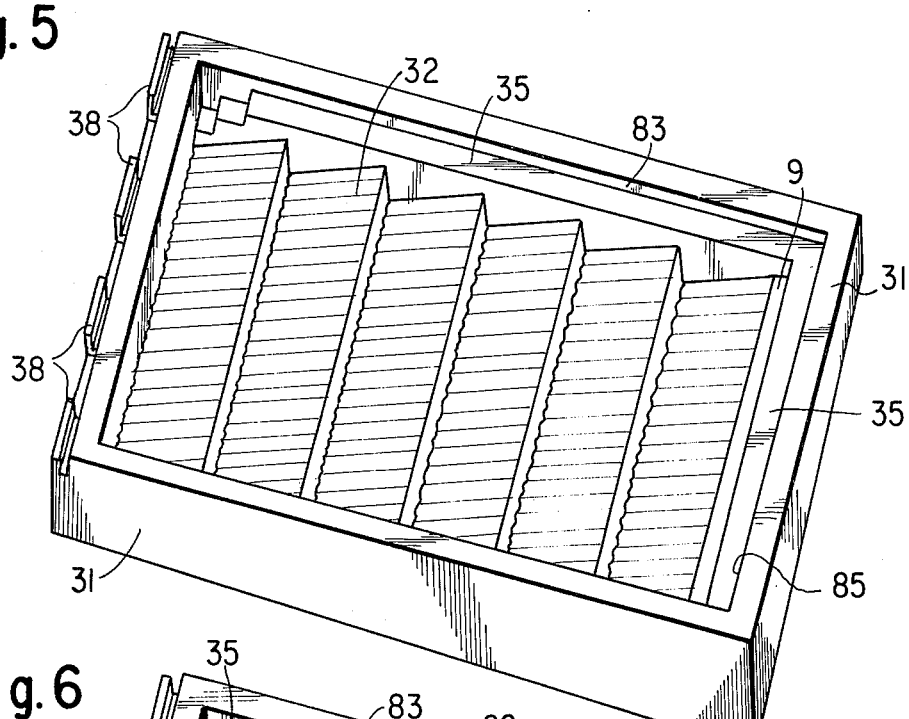
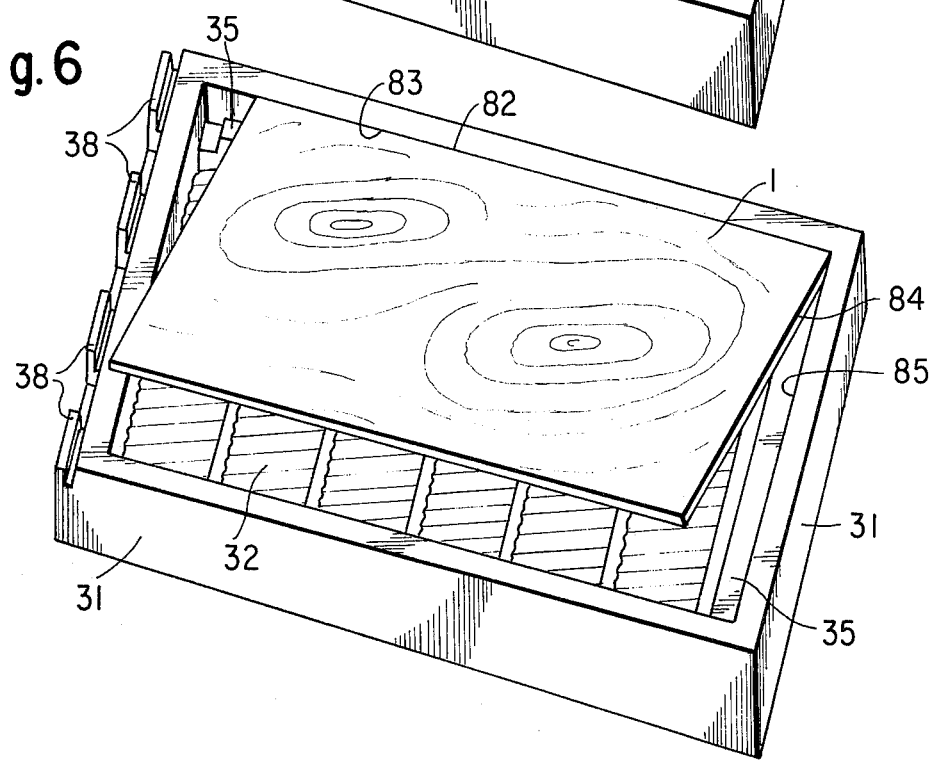
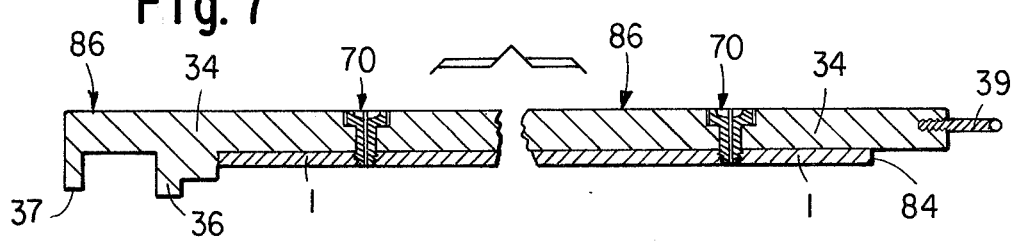

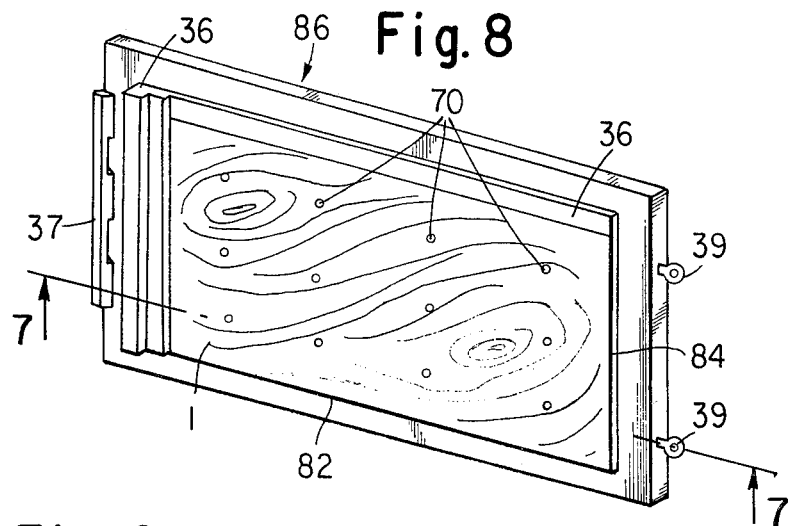
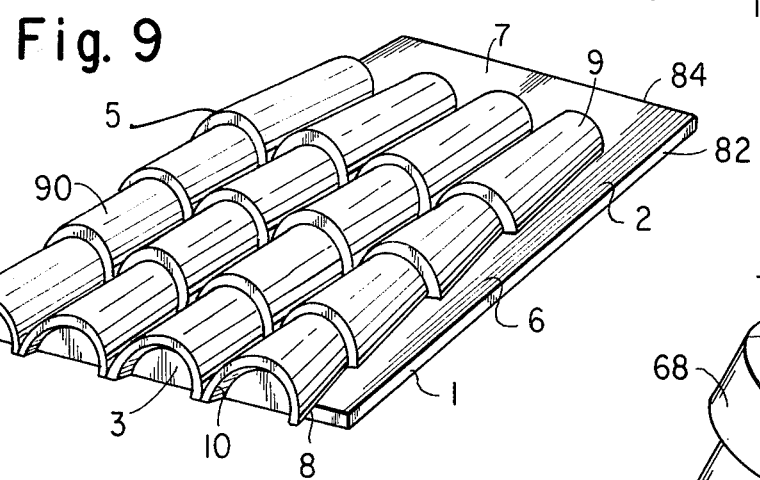
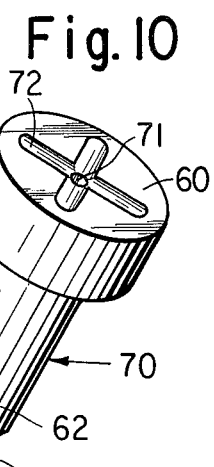
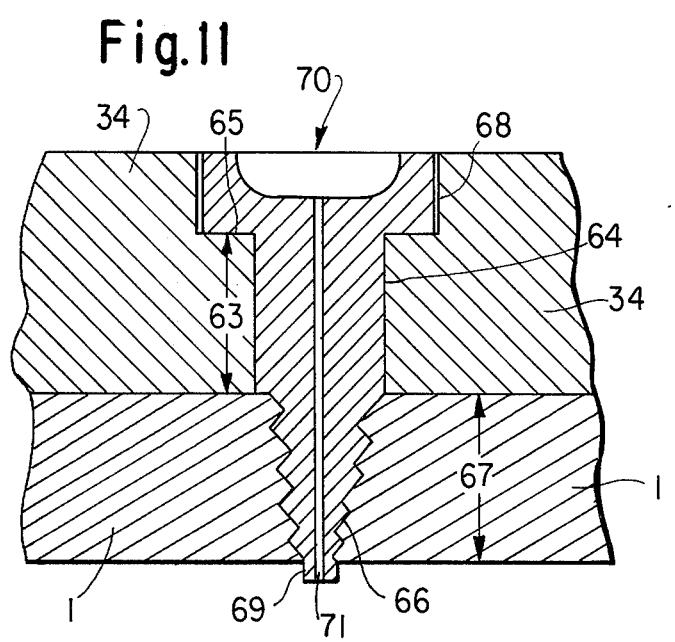

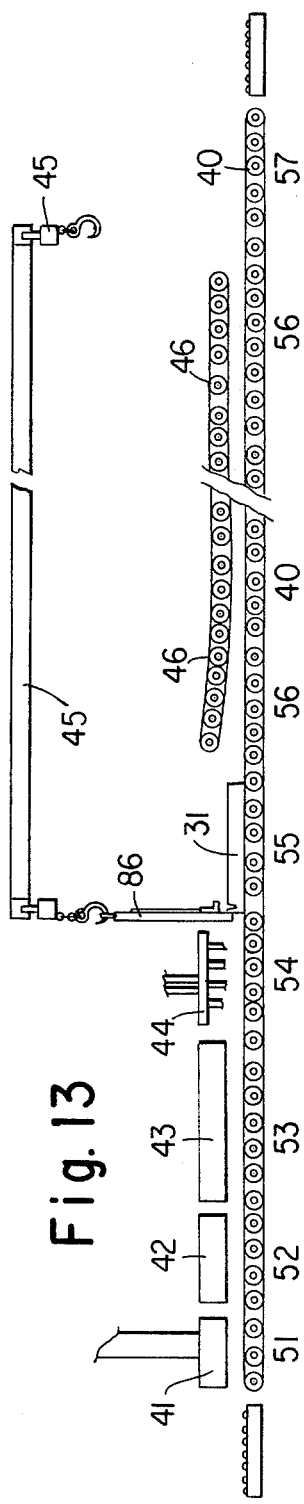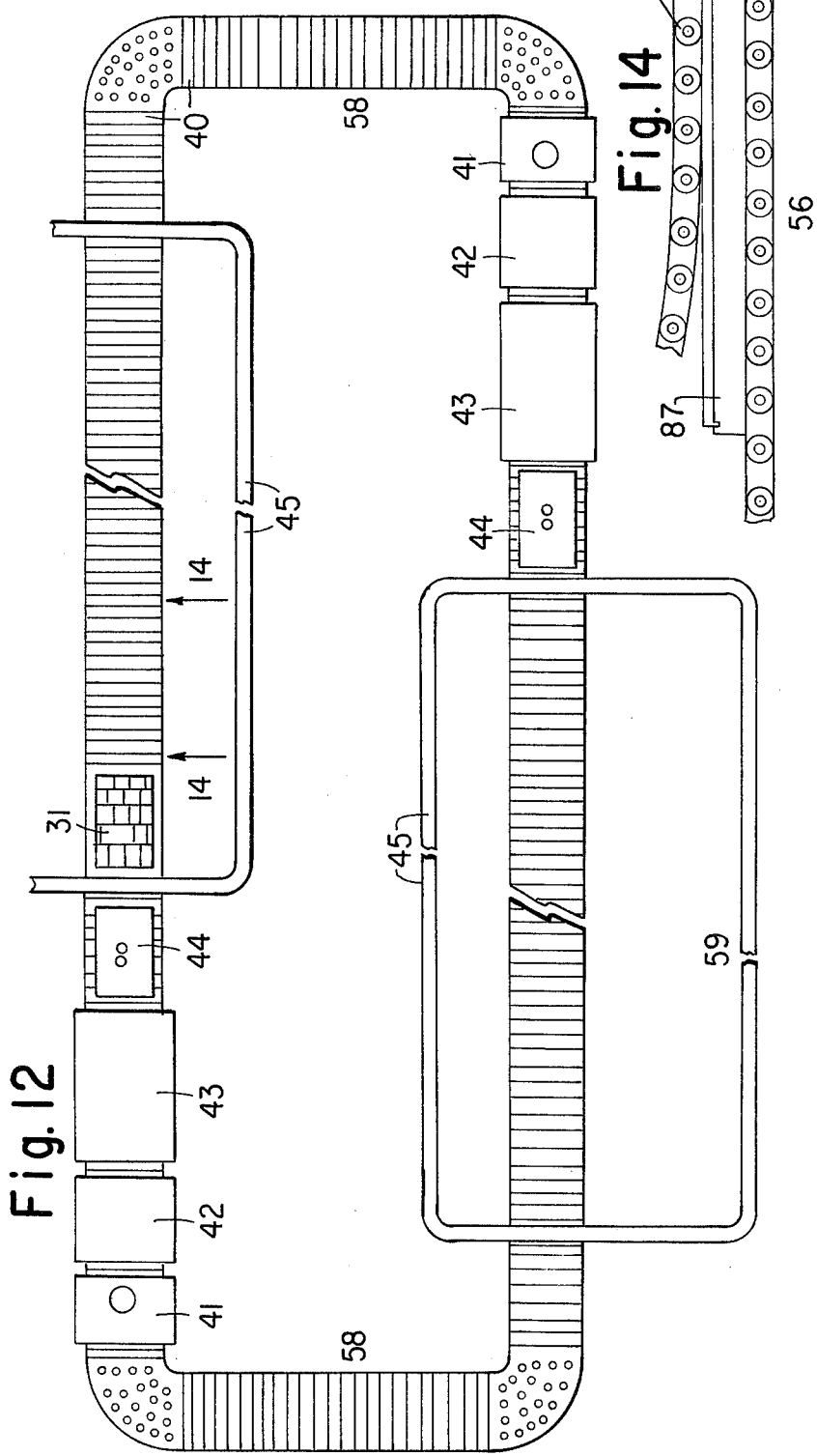

METHOD OF MOLDING A COMPOSITE SYNTHETIC ROOFING STRUCTURE

BACKGROUND OF THE INVENTION

The background of the invention will be set forth in two parts.

The present invention generally pertains to the field of building construction and building remodeling, and more particularly to the field of roofing for residential buildings.

Over the years the use of man-made materials as replacement for naturally occurring materials, such as wood and slate for example, in order to reduce the cost of roofing have become increasingly popular. In fact, a very large industry has been developed to produce roofing using asphalt-based materials. These products have become very popular because of their ease of use and relatively low cost as compared with the aforementioned wood and slate and as also compared with traditional man-made tile roofing.

With the advent of plastics, much research has gone into adapting its use to the roofing industry. At first, the synthetics were applied in sheet form only for their water-resistant qualities, but more recently attention has been focused on polystyrene and polyurethane foams for their heat and sound insulating characteristics.

Probably the widest use of such lather foam which is formed from a foamable polyurethane resin reaction mixture is to apply it while in a liquid state by hose and spraying equipment directly onto a roof bed. This technique has proven itself to be very valuable for commercial building projects, but because of its cost and the fact that it is only practical on relatively flat roofs, and because it is not very pleasing aesthetically, it is not generally used as a residential roofing medium.

Noting the desirable heat and sound insulating qualities, the industry has worked with the polyfoam in the form of boards or large rectangular sheets having opposite broad flat surfaces from one to two inches in thickness. Invariably, impermeable plastic sheets or layers of felt and bituminous material are cemented or otherwise bonded to the roof support structure prior to laying down the foam boards so that water cannot seep through the seams between abutting ones of these boards. Also, protective layers are generally provided on the outer flat surface of the foam boards in order to lessen decomposition thereof when certain ones of the foam materials are exposed to wind, rain and sunlight.

Not only is this latter technique very complicated and costly, but also the results leave much to be desired as to eye appeal. Accordingly, it has been found that this flat-type construction is not generally desired by home owners and is seldom used.

In order to overcome this disadvantage and in order to eliminate the need for a truss element (since these panels lack strength to support themselves), a newer scheme has developed whereby laminated plastic boards or panels, including a foam core, are bent to a desired curvature. Since a flat board of foamed polyurethane that has been arched or curved has a strong tendency to assume its original flat shape, a structural tie must necessarily be provided between the inner and outer layers of the curved panel material to hold the panel at the desired curvature. This can be accomplished, for example, by piercing the foam with a number of holes at predetermined intervals and filling the holes with a fiber glass resin composition to chemically bond with the same material coated on the surfaces of the foam.

SUMMARY OF THE INVENTION

In view of the foregoing factors and conditions characteristic of the prior art, it is a primary object of the present invention to provide a new and improved method for molding a roofing material retaining all of the advantages but not subject to the disadvantages of the prior art.

It is another object of the present invention to manufacture a form molded synthetic foam roofing material having very good heat and sound insulating characteristics.

It is also another object of the present invention to manufacture a strong and economical-to-fabricate molded synthetic roofing.

It is a further object of the invention to manufacture a relatively lightweight and waterproof molded synthetic roofing material utilizing synthetic foam having an exposed outer surface resembling conventional naturally-occurring and man-made roofing.

It is yet another object of this invention to manufacture form-molded synthetic foam roofing in any of various aesthetically pleasing configurations, including European tile and slate.

According to the present invention, a form-molded synthetic foam roofing structure is united in process to a support structure, including a relatively broad surface to be affixed to a roof support structure. United in process to the support structure is a form-molded synthetic foam roofing section having a relatively broad undersurface, the roofing section having an exposed surface configured to resemble a plurality of interlocked and overlapping roofing shingles.

The features of the present invention which are believed to be novel are set forth with particularity in the appended claims. The present invention, both as to its organization and manner of operation, together with further objects and advantages thereof, may best be understood by making reference to the following description, taken in connection with the accompanying drawing, in which like reference characters refer to like elements in the several views.

BRIEF DESCRIPTION OF THE DRAWINGS

FIG. 1a is a perspective view of a section of form-molded synthetic foam roofing constructed in accordance with the present invention;

FIG. 1b is a partial sectional illustration of rear section of the form-molded synthetic foam shingle in accordance with the invention taken on line 1b—1b of FIG. 1a;

FIG. 1c is a partial sectional illustration of rear and front sections of the form-molded synthetic foam shingles in accordance with the invention being mounted onto the sub-roof and taken generally in the same plane as FIG. 1b;

FIG. 2a is a partial sectional illustration of a roofing construction utilizing form-molded synthetic foam roofing materials in accordance with the invention;

FIG. 2b is a partial sectional illustration of right and left sections of the form-molded synthetic foam shingles being mounted on the sub-roof in accordance with the invention and is in effect an enlarged fragment of the center portion of FIG. 2a;

FIG. 3 is a partial view in cross-section of a form mold made of metal with stepped pressure plate illustrating the stepped front and rear sections and the present form-molded synthetic foam roofing construction formed therein;

FIG. 4 is a partial view in cross-section of a form mold made with a silicone rubber insert with stepped pressure plate illustrating the stepped side sections and the present form-mold synthetic foam roofing construction formed therein;

FIG. 5 is a perspective view of a form mold illustrating the cavity that would give the finished product the outer surface of interlocking wood shingles. The view also illustrates the interstepped edges and key system that would give protruding edges of the base member to the finished product;

FIG. 6 is a perspective view of a form mold illustrating the positioning of the base member onto and into the cavity of the form mold;

FIG. 7 is a partial sectional illustration of the pressure plate assembly taken from FIG. 8, showing the key-stepped system of the pressure plate that locks and also gives exposed edges to the base member and foam of the finished product, and the attachment of the base member to the pressure plate;

FIG. 8 is a perspective view of the pressure plate assembly illustrating the stepped surface that keys into the form mold and also the base member affixed into position on the pressure plate;

FIG. 9 is a perspective view showing a section of a form-molded synthetic foam roofing construction in the form of Spanish tile;

FIG. 10 is a perspective view illustrating the vent screw;

FIG. 11 is a partial view in cross-section of an attachment vent screw and pressure plate taken from FIG. 7;

FIG. 12 is a plan view of a conveyor system for producing form-molded synthetic foam roofing structure according to this invention;

FIG. 13 is an elevational view of apparatus and conveyor system; and

FIG. 14 is a partial view taken on line 14—14 of FIG. 12, illustrating mold assembly entering secure rollers of the securing station area in the conveyor system.

DETAILED DESCRIPTION OF THE SHOWN EMBODIMENT

With reference now to the drawing and more particularly to FIG. 1a, there is shown, preferably of somewhat porous material such as plywood, pressed wood, masonite, for example, upon an upper broad surface 2 of which is united in process a form-molded synthetic foam roofing section 3. The section 3 has a relatively broad undersurface 4 united in process to the surface 2 of support base member 1 and also has an exposed outer surface 5 configured (by the shape of the process mold 31) to resemble a plurality of interlocked and overlapping roofing shingles or tiles.

It will be noted that a side portion 6 of the support base member 1 extends beyond the form-molded synthetic foam section 3 and also at the rear portion 7. At the same time, it will be noted that the forwardmost portion 8 of the foam section 3 extends beyond the base member 1 as does the left-side portion 21 as seen in FIG. 2a.

FIG. 1b gives a cross-section of the rear portion of the form-molded synthetic foam shingle. It will be noted that a flat step portion 9 will be interlocking with front step section 10 of another form-molded synthetic foam shingle, as shown in FIG. 1c.

FIG. 1c demonstrates how form-molded synthetic foam shingles A and B could be mounted or attached to rafters, sub-roof or existing roofing 20. Synthetic foam shingle A is first placed on sub-roof 20; then nails 11 are driven through sections 6 and 7 of support base member 1 into sub-roof 20. After form-molded synthetic foam shingle A has been secured to sub-roof 20, then waterproof adhesive 12 is placed along flange sections 7 and 9 and also sub-roof 20. Now form-molded synthetic foam shingle B is placed so that it interlocks portions 8 and 10 onto portions 7 and 9 of shingle A and is secured by adhesive 12.

In FIG. 2a the form-molded synthetic foam shingles would be secured in the same manner as described in FIG. 1c. FIG. 2b shows left-side portion 21 fitting on top of right-side portion 6.

Adhesives may be used to secure the form-molded synthetic foam shingle to the sub-roof wherever nails could not be used, such as the leading edge.

With reference to FIG. 3, a form mold 31 is shown having a contour 32 designed to provide a tile or shingle configuration. For example, the contour 32 in this embodiment of the invention produces a wood shake roof design in the outer surface 5, as seen in FIG. 1a.

In fabricating the form-molded synthetic foam roof section, a barrier coat 33 is first applied to the mold surface 32 of mold 31. This barrier coat 33 could be in the form of acrylic paint when a silicone rubber insert 80 is used or wax, flourocarbon spray, silicone lubricant or any of the known forms of parting agents when mold 31 is made of hard materials, such as metal or epoxy. When the barrier coat 33 is dry, then liquid synthetic foam such as a foamable thermosetting resin reaction mixture, e.g., a foamable polyurethane resin reaction mixture is poured or injected (sprayed) into the cavity of mold 31 on top of barrier coat 33. The base member 1 is then fitted onto the stepped section 35 of the cavity of mold 31, as shown in FIG. 6. This can be done by hand placing. Note that base member 1's edge 82 is placed against step 35 and 83 of mold 31 at the same time edge 84 of base member 1 is butted against step 35 and 85 then lowered into place, or by attaching the base member 1 to pressure plate 34 as shown in FIG. 7. Note that base member 1 will be fitted into the stepped portion 36 of pressure plate 34 as shown in FIG. 8. Attachment can be done by fasteners, such as attachment vent screws 70 (shown in FIG. 10) through pressure plate 34 and into base member 1 as shown in FIGS. 3, 7 and 11. Attachment will be done prior to pouring the foam 3 into the mold cavity of mold 31. The hand placing of base member 1 and pressure plate 34, or the lowering of pressure plate 34 with base member 1 attached onto mold 31 is done before foam 3 starts to rise or expand. This positioning of the base member 1 in and onto the stepped section 35 of the mold cavity of mold 31 will provide exposed base portions 6 and 7 of the finished product. The stepped sections 36 of pressure plate 34 will provide interlocking edges 8, 10 and 21 of the foam 3 portion of the finished product. The step will also act as a key to locate and prevent sliding movement of the pressure plate 34 to mold 31. This will also prevent mismatched finished products. The pressure plate 34 then will be secured to the mold 31 by clamps, conveyor rollers 40, 46 as shown in FIG. 14 or by other means. During the expansion of the synthetic foam, which occurs shortly after being poured, the shape of the shingle is permanently formed, and, at the same time, the synthetic foam enters into the pores of the base member 1, uniting the base member 1 and synthetic foam section 3 as one.

When the cure cycle of the synthetic foam is completed, the clamps will be removed from the pressure plate 34 and mold 31. The pressure plate 34 will be removed from mold 31. If a silicone rubber insert 80 is used, it will be stripped from the foam section 3, base member 1 and pressure plate 34. The attachment vent screws 70 will be removed from the pressure plate 34. Then the finished product is removed from the pressure plate 34 and is ready for use or to be stored for future use. Color of the form-molded synthetic roofing section can be predetermined by either using pigments in the synthetic foam or in the barrier coat 33, or both. It will be noted that machining is not required to produce the finished product.

As noted above, any exposed surface configuration 5 may be provided by an appropriate form mold contour surface 32. Thus, the exposed surface 5 of the form-molded synthetic foam section 3 may resemble a plurality of interlocking and overlapping Spanish tiles 90, as illustrated in FIG. 9. It should, therefore, be obvious that Mission, as well as any of the popular English, French, German, etc. tiles and shingles may be fabricated, only limited by the imagination of the designer.

For fastening the base member 1 to the pressure plate 34, attention is given to FIGS. 10 and 11, the attachment vent screw 70. The attachment vent screw 70 has a round diameter head 60 and is slotted for conventional type screw drivers. Phillips slot is shown 72 in FIG. 10. The length of the screw head 68 shall not be greater than the depth of the counter bored hole 65 in the pressure plate 34. Shank length 62 is the same as the thickness 63 of the pressure plate 34 after screw hole 64 has been counter bored 65. The thread 66 is that of a wood screw. The length is determined by the thickness 67 of the base member 1. The pilot shank 69 can be from 1/16 to 2 ⅛ inch in length. The diameter of the vent hole 71 should be small, 40 drill size would be sufficient. The vent hole 71 is to vent trapped air, not synthetic foam 3. The small vent hole in preventing the foam 3 from escaping will cause the foam 3 to pack to a greater density.

A method of continuous production is illustrated in FIGS. 12 and 13. The conveyor system components that are utilized are widely known and obtainable. The spray booth 41 could be either manual or automated. There are numerous devices available to spray parting agents or barrier coatings. The spray booth should be equipped with an exhaust ventilation system. The drying compartment 42 would have electric heating elements and fans to circulate the air. A thermostat would be used to control the heat. The chilling compartment 43 is equipped with refrigeration units capable of quick chilling of the surface 32 of mold 31. Sensors would be used to check the surface temperature and also control station area 53 of the conveyor system. The foam spraying apparatus 44 will have sufficient number of nozzles to give a quick, even distribution of foam into the mold cavity. The overhead conveyor system 45 can be any of the many that are available. It should be equipped with a rapid hoist. The roller system 40 should have sufficient strength to support mold assembly 86. It will be equipped with timing devices that control the advance of the mold 31 and mold assembly 87. In the securing station area 56 of the roller system, the upper rollers 46 will be coated to prevent the excess foam that might escape from the attachment vent screws 70 from adhering to the rollers 46. The distance between the upper rollers 46 and the lower rollers 40 would be the thickness of the mold assembly 87.

The sequence of the process is that mold 31 enters the spray booth 41 at station area 51, at which time a parting agent or barrier coat 33 is sprayed onto the surface of the cavity of mold 31. The mold 31 then proceeds to the drying compartment 42 at which time the barrier coat 33 (acrylic paint) is thoroughly dried. Upon leaving the drying station area 52, the mold 31 then enters the chilling compartment 43. The surface of the cavity of mold 31 is quickly chilled. The chilling will cause a retarding action in the foam 3. This will give a thicker surface skin, eliminating the use of two densities of synthetic foam and allowing more time to fit the pressure plate 34 to the mold 31. The mold 31 then travels to station area 54 where foam 3 is sprayed into the cavity of mold 31. The mold 31 then proceeds to station area 55. The pressure plate assembly 86 is then partly lowered so that the male half hinge 37 is fitted into the female half hinge 38 of mold 31. After contact is made the pressure plate assembly 86 is then lowered on top of mold 31 making mold assembly 87. The lowering hooks are then removed from the attachment eyes 39 of the pressure plate 34. The mold assembly 87 then travels to the securing station area 56. When entering this area the mold assembly 87 is secured by the downward pressure of the upper rollers 46 shown in FIG. 14. During the travel through area 56 the synthetic foam expands, forcing itself into the pores of the base member 1 and also making its permanent shape from the mold 31 and pressure plate 34. The trapped air escapes through the attachment vent screws 70. The cure cycle begins and ends during the travel in securing area 56. Upon leaving the securing area 56, the mold assembly 87 is ready to be disassembled. The hanger hooks are lowered from the overhead conveyor 45 and attached to the pressure plate hook eyes 39. Then the pressure plate assembly 86 is hoisted off the mold 31. If a silicone rubber insert 80 is used, it is also lifted from the mold casing 81 with the pressure plate assembly 86. The mold 31 is then inspected and any foam flash is removed. The mold 31 is then sent through the system again. If a silicone rubber insert 80 is used, a clean silicon rubber insert 80 is placed in the mold casing 81 and is then sent through the system.

The attachment vent screws 70 are removed from the pressure plate 34 that is hanging on the overhead conveyor 45. The finished product is then removed. If a silicone rubber insert 80 is used, it is stripped from the pressure plate assembly 86 before the attachment vent screws 70 are removed. The pressure plate 34 is inspected and any flash is removed. The pressure plate 34 is then sent to station area 59 where a new base member 1 is attached to form a new pressure plate assembly 86; then it returns to conveyor station area 55. The finished product is sent to a storage area.

From the foregoing, it should be evident that there has been described and illustrated a ready-made, inexpensive, easily installed roofing material that is molded into the shape of natural (slate, wood, etc.) or more expensive man-made (clay tile) roofing products. The invention utilizes lightweight, self-skinning, closed cellular foam and back-up support material to add strength, such as plywood, for example, and be provided in various sizes and will drastically cut or reduce the installation time and labor cost so that the professional roofer and the layman alike can easily install a beautiful roof on a dwelling. The roof so provided will be both of weather and sound-proofing qualities and also act as a fire retardant because of this desirable characteristic of polyurethane and other closed cellular foam materials with fire-retardant properties.

Thus, although specific embodiments of the invention have been described in detail, it should be clear that the invention is susceptible to numerous modifications and embodiments within the attainment of one skilled in the art and without the exercise of the inventive faculty.

What is claimed is:

1. A method of molding a composite foam synthetic resin product having a stepped portion on at least one edge thereof comprising the steps of:
    introducing into a barrier coated contoured cavity of an open mold having an internal stepped section about a portion of the periphery of said cavity a foamable thermosetting resin reaction mixture;
    temporarily attaching a relatively broad surface reinforcing base member into a stepped portion of a pressure plate for said mold;
    placing said pressure plate with said base member attached thereto on said mold with said base member fitted into said stepped section of said mold;
    securing said pressure plate to said mold, permitting said reaction mixture to foam, cure and unite to said base member;
    removing said pressure plate from said mold with the composite foamed resin structure attached thereto after the thermosetting resin foam has cured; and
    removing the composite foam synthetic resin product from said pressure plate.

2. The method according to claim 1 wherein said stepped section of said pressure plate engages said stepped section of said mold.

3. The method according to claim 2 wherein said stepped surface of the pressure plate provides an interlocking edge for said product.

4. The method according to claim 1 wherein said surfaces of said contoured cavity are designed to impart to said product the shape of slate, tile or wood shingles.

5. The method according to claim 1, wherein said mold has stepped internal edges to position said base member.

6. The method according to claim 5, wherein said stepped internal edges provide exposed interlocking edges to a base member on the finished product.

7. The method according to claim 1, wherein said mold and pressure plate have open hinges.

8. The method according to claim 1 wherein said pressure plate has lifting eyes and vented, base attaching means.

9. The method according to claim 1 wherein said step of attaching said base member to said pressure plate includes attaching said base member to said pressure plate by means of screws having a small vent hole.

10. A method of molding a composite foam synthetic resin roofing structure having a stepped portion on at least one edge thereof utilizing a conveyor system comprising the steps of:
    placing on a conveyor an open mold having an internal stepped section about a portion of the periphery of the contoured cavity of said mold; moving said mold to a spray booth and spraying a barrier coat over the contoured surface of said cavity;
    moving said coated mold to a drying booth and drying said barrier coat; then
    moving said mold to a chilling compartment and chilling the coated surface of said mold;
    temporarily attaching a relatively broad surface reinforcing base member into a stepped portion of a pressure plate for said mold;
    introducing into said chilled, coated mold a foamable thermosetting resin reaction mixture;
    placing said pressure plate with said base member attached thereto on said mold with said base member fittedinto said stepped section of said mold;
    securing said pressure plate to said mold by passing them between a set of rollers, permitting said reaction mixture to foam, cure and unite to said base member;
    removing said pressure plate from said mold with the composite foamed resin structure attached thereto after the thermosetting resin foam has cured; and
    removing the composite foam synthetic resin product from said pressure plate.

11. The method according to claim 10 wherein said stepped section of said pressure plate engages said stepped section of said mold.

12. The method according to claim 10, wherein said base member is attached to said pressure plate by screws having a small vent hole.

13. The method according to claim 10, wherein said securing rollers are coated to protect them from foam attachment or build-up;
    said mold is lined with a silicone rubber mold insert; and said insert is sprayed with an acrylic paintbarrier coat.

* * * * *

UNITED STATES PATENT OFFICE
CERTIFICATE OF CORRECTION

Patent No. 4,028,450          Dated June 7, 1977

Inventor(s) Walter M. Gould

It is certified that error appears in the above-identified patent and that said Letters Patent are hereby corrected as shown below:

Column 5, line 41, "2" should be deleted.

Signed and Sealed this

Eleventh Day of October 1977

[SEAL]

Attest:

RUTH C. MASON          LUTRELLE F. PARKER
*Attesting Officer*     *Acting Commissioner of Patents and Trademarks*